R. B. FAGEOL.
TRANSPORTATION SYSTEM.
APPLICATION FILED JULY 26, 1915.
1,219,276.
Patented Mar. 13, 1917.
2 SHEETS—SHEET 1.
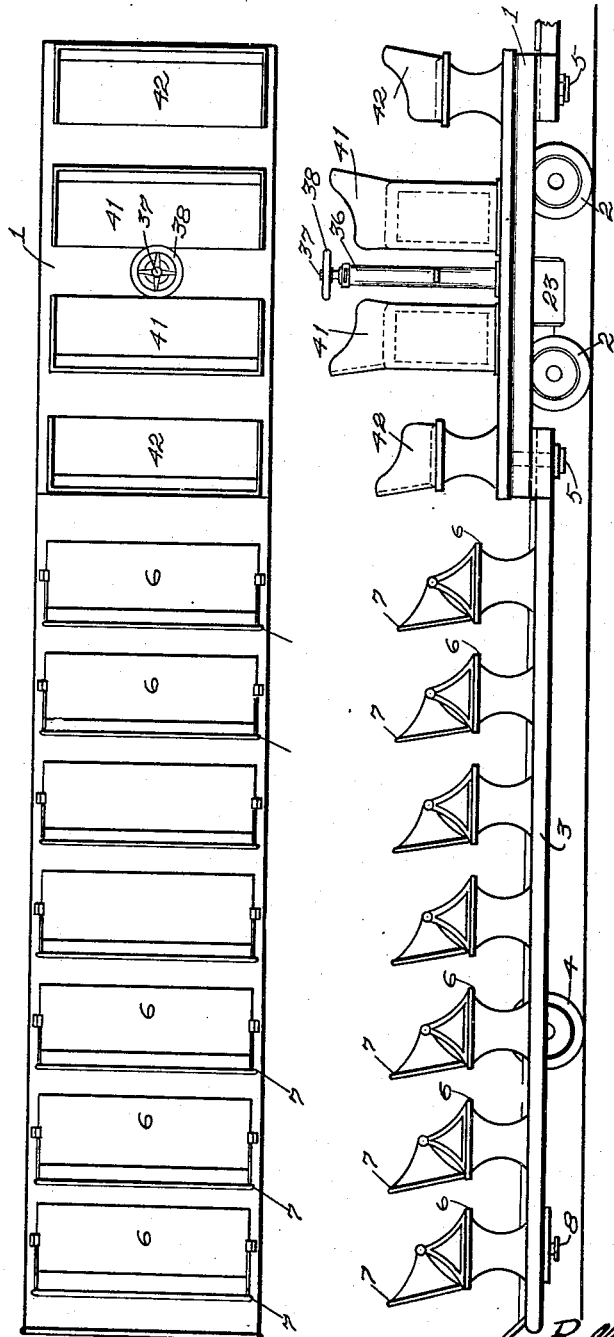

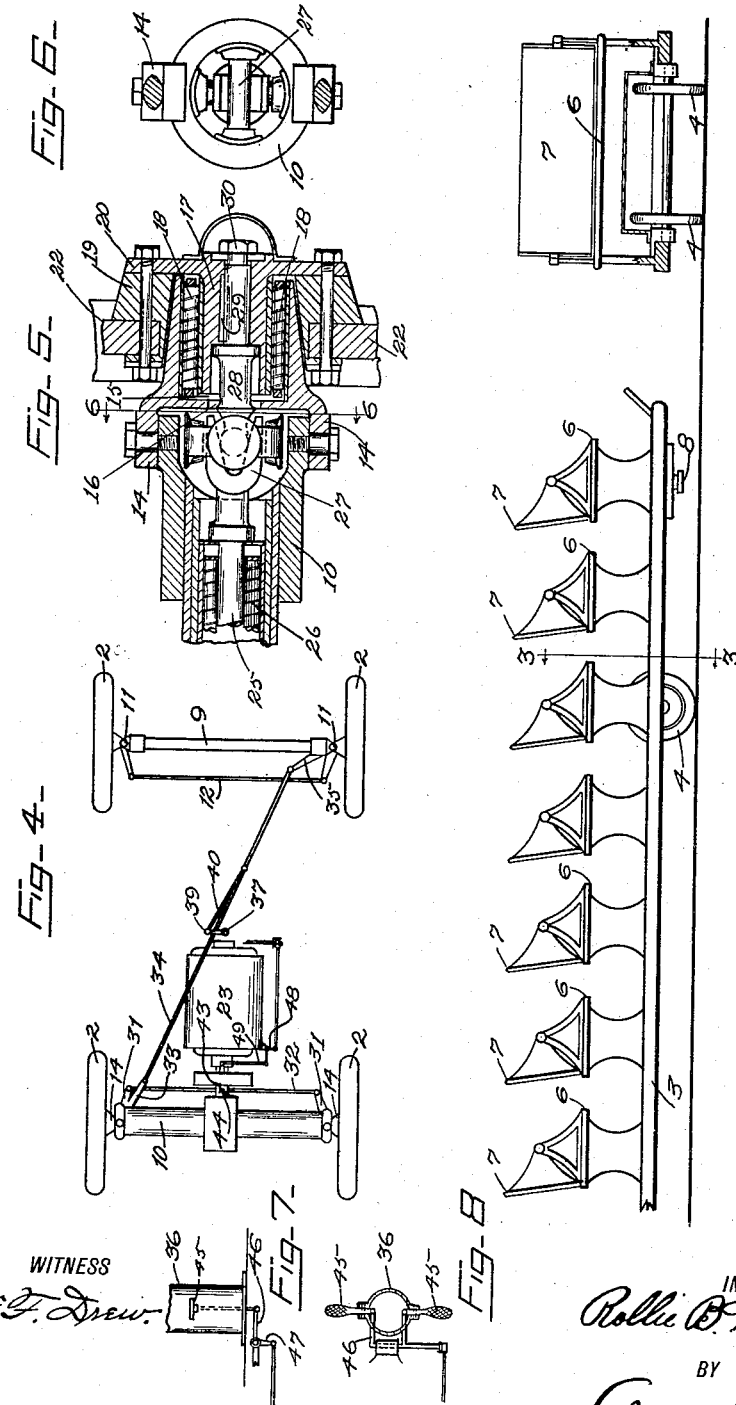

UNITED STATES PATENT OFFICE.

ROLLIE B. FAGEOL, OF OAKLAND, CALIFORNIA.

TRANSPORTATION SYSTEM.

1,219,276.      Specification of Letters Patent.      Patented Mar. 13, 1917.

Application filed July 26, 1915. Serial No. 41,825.

*To all whom it may concern:*

Be it known that I, ROLLIE B. FAGEOL, a citizen of the United States, residing at Oakland, in the county of Alameda and State of California, have invented certain new and useful Improvements in Transportation Systems, of which the following is a specification.

The present invention relates to improvements in vehicles and more particularly to a passenger carrying train or arrangement of vehicles adapted for use at summer resorts, pleasure parks or the like, wherein the road surface for vehicles is limited and wherein the traffic is heavy and congested; and the invention has for its objects to provide a train in which there is employed a motor vehicle and one or more passenger carrying vehicles, each passenger carrying vehicle being supported adjacent to one end by a pair of supporting wheels and pivotally suspended at the other by the adjacent vehicle; one wherein the motor vehicle is capable of being steered by all of its supporting wheels and is positioned intermediate the passenger carrying vehicles, thereby insuring the guiding of the entire vehicle train, and enabling the operator to steer and have perfect control over the train in congested traffic. To provide a vehicle wherein the operating and controlling means is positioned intermediate the ends thereof so that the vehicle operator may have free passage on either side thereof, thereby enabling the operator to face in the direction of travel of the vehicle.

With the above mentioned and other objects in view, the invention consists in the novel construction and combination of parts hereinafter described, illustrated in the accompanying drawings, and pointed out in the claim hereto appended; it being understood that various changes in the form, proportion, size and minor details of construction within the scope of the claim may be resorted to without departing from the spirit or sacrificing any of the advantages of the invention.

To more fully comprehend the invention, reference is directed to the accompanying drawings wherein—

Figures 1 and 1^A disclose a view in side elevation of an embodiment of my invention, disclosing the motor car, the arrangement of the passenger carrying vehicles propelled thereby and the manner of pivotally supporting the free end thereof.

Fig. 2 is a view in top plan of Fig. 1, disclosing the seat arrangement.

Fig. 3 is a sectional view taken on line 3—3 of Fig. 1^A.

Fig. 4 is a view in plan of the motor vehicle with the body removed, disclosing the manner of driving and steering.

Fig. 5 is a longitudinal sectional view of the preferred form of one of the driving and steering axles.

Fig. 6 is a sectional view taken on line 6—6 of Fig. 5.

Fig. 7 is a view in detail of the motor vehicle steering post and brake operating mechanism.

Fig. 8 is a view in cross section of the steering post disclosing the brake operating pedals.

Referring more particularly to the several views of the drawings, wherein like characters of reference designate corresponding parts throughout the several views, 1 indicates a suitable propelling vehicle carried by the supporting wheels 2. Positioned preferably one at either end of the vehicle 1 are the passenger carrying vehicles 3, each supported adjacent to their outer ends by the wheels 4, and extending at their opposite ends under the ends of the body 1, where they are pivotally suspended by the headed king bolts 5 carried by the body of the vehicle 1. Transversely extending parallel spaced seats 6 are carried by the passenger carrying vehicles 3 and the same are provided with reversible backs 7 to permit the passengers to face in the direction of travel of the vehicle. Suitable headed king bolts 8 are carried at the end of the vehicle 3, adjacent the wheels 4, for supporting the free end of another vehicle should it be desired to attach the same.

The propelling vehicle 1, which is preferably of the four wheel steer and two wheel drive type, is provided with the stationary front wheel supporting axles 9 and rear wheel supporting axle housing 10, and pivotally mounted on the ends of the front axle are the spindles 11 which support the front wheels of the vehicle and which are pivotally connected by the rod 12. The rear axle housing 10 is tubular and on the ends of the same are pivotally mounted the tubular spindles 14, the opening 15 of which communicates through an opening 16 with the tubular axle housing 10. A tubular supporting member 17 extends within the opening 15, and the same operates on a suitable roller bearing 18 within the opening 15 and into which the supporting member 17 extends. A wheel supporting hub 19 is bolted to the annular flange 20 extending from the member 17 and carries the wheel spokes 22.

Power is delivered to the driving wheels from a suitable motor 23, which operates the driving axle 25 rotatably mounted on bearings 26 in the housing 10, and said axle connects at its opposite ends through the universal joint 27, of any suitable construction, with a drive stub axle 28, which extends through the center of the member 17 and is locked to rotate therewith by the key 29 and retaining nut 30. The spindles 14 carry the arms 31 which are pivotally connected by the rod 32 and one of said spindles also carries an arm 33 which is pivotally connected with one end of a steering rod 34 which pivotally connects at its opposite end with an arm 35 extended from the front spindle 11, which is at the farther end of the front axle.

A steering column 36 is located preferably midway of the propelling vehicle 1, and rotatably mounted in the same is the steering post 37 carrying at its upper end the steering wheel 38, and at its lower end a laterally disposed arm 39 which pivotally connects through a link 40 with the steering rod 34.

Suitable operator seats 41 are provided on either side of the steering column, one facing toward each end of the vehicle, and if desirable other passenger carrying seats 42 may also be provided.

A suitable brake 43 coöperates with the motor shaft 44 and the same is operated through foot pedals 45, pivotally mounted one at either side of the steering column, and said pedals connect with said brake through the forked crank arm 46, link 47, crank arm 48 and link 49.

It is to be understood that any suitable system of wiring to the motor may be employed and if desired the batteries may be positioned beneath the seats 41, as shown in dotted lines, and in place of the electric motive power an internal combustion engine may be employed for propelling purposes, if desired.

While I have illustrated and described a preferred form of propelling vehicle, it is to be understood that the same may be constructed in any suitable manner, just so long as to permit the operator thereof to face in either direction, and to permit the same to steer with all of its supporting wheels, and while I have disclosed the passenger carrying vehicles as having transverse seats, the same may be separated by a longitudinal aisle, or extend longitudinally and be separated by an aisle, or placed with the backs thereof toward each other. It will be apparent that each passenger carrying vehicle is provided with supporting wheels at but one end, the other end thereof being pivotally supported to the end of the next passenger carrying vehicle, or the propelling vehicle, as the case may be.

Having thus described my invention, what I claim is:—

A transportation system comprising a propelling vehicle or power unit having self contained power mechanism and having steering and supporting wheels, certain of said supporting wheels capable of being driven by said power mechanism and all of said supporting wheels capable of operation in unison to steer, a pair of trailers each having a single pair of supporting wheels adjacent one end, one of said trailers adapted for positioning at each end of the propelling vehicle, and a pivotal connection between the free unsupported ends of said trailers and the opposite ends of said propelling vehicle, whereby the free end of said trailers is supported at the opposite ends of said propelling vehicle and said propelling vehicle and trailers are caused to track on the steering of the steering wheels of said propelling vehicle.

In testimony whereof I have signed my name to this specification in the presence of a subscribing witness.

ROLLIE B. FAGEOL.

Witness:
    D. B. RICHARDS.